US007089279B1

(12) United States Patent
Sakaguchi

(10) Patent No.: US 7,089,279 B1
(45) Date of Patent: Aug. 8, 2006

(54) METHOD AND SYSTEM FOR COLLABORATING AMONG INTERCONNECTED CLIENT TERMINALS

(75) Inventor: Akira Sakaguchi, Fuchu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,130

(22) Filed: Nov. 12, 1999

(30) Foreign Application Priority Data

Dec. 16, 1998 (JP) .................................. 10-357795

(51) Int. Cl.
*G06F 13/00* (2006.01)
(52) U.S. Cl. ...................................... 709/203; 709/204
(58) Field of Classification Search ................ 709/203, 709/247, 246, 204, 205, 200–202, 217–220
See application file for complete search history.

(56) References Cited

U.S. PATENT DOCUMENTS

| 5,307,086 A | * | 4/1994 | Griffin et al. ................ 715/808 |
| 5,699,528 A | * | 12/1997 | Hogan ......................... 705/40 |
| 5,732,219 A | * | 3/1998 | Blumer et al. .............. 709/227 |
| 5,764,235 A | * | 6/1998 | Hunt et al. .................. 345/428 |
| 5,809,242 A | * | 9/1998 | Shaw et al. .................. 709/217 |
| 5,862,330 A | * | 1/1999 | Anupam et al. ............. 709/204 |
| 5,892,908 A | * | 4/1999 | Hughes et al. .............. 707/100 |
| 5,911,776 A | * | 6/1999 | Guck ......................... 707/104.1 |
| 5,996,002 A | * | 11/1999 | Katsurabayashi et al. ... 709/204 |
| 6,073,241 A | * | 6/2000 | Rosenberg et al. ......... 713/201 |
| 6,085,195 A | * | 7/2000 | Hoyt et al. .................. 707/10 |
| 6,144,992 A | * | 11/2000 | Turpin et al. ............... 709/208 |
| 6,337,712 B1 | * | 1/2002 | Shiota et al. ............. 348/231.1 |
| 6,343,313 B1 | * | 1/2002 | Salesky et al. ............. 709/204 |
| 6,502,137 B1 | * | 12/2002 | Peterson et al. ............ 709/229 |

* cited by examiner

*Primary Examiner*—Moustafa M. Meky
(74) *Attorney, Agent, or Firm*—Duke W. Yee; A. Bruce Clay; Francis Lammes

(57) ABSTRACT

The present invention is directed toward a method, software product, and apparatus for allowing various kinds of information existing on a client terminal to be referred to on a Web browser of another collaborating client terminal. If an image displayed on a display screen of client terminal is specified, the image is compressed to a predetermined formed image data and also given a unique name in the system. This file is automatically sent to a Web server. A Web browser operating on the client terminal is automatically switched to display the file. A Web browser of another client terminal collaborating with this client terminal is also switched to display the file.

13 Claims, 10 Drawing Sheets

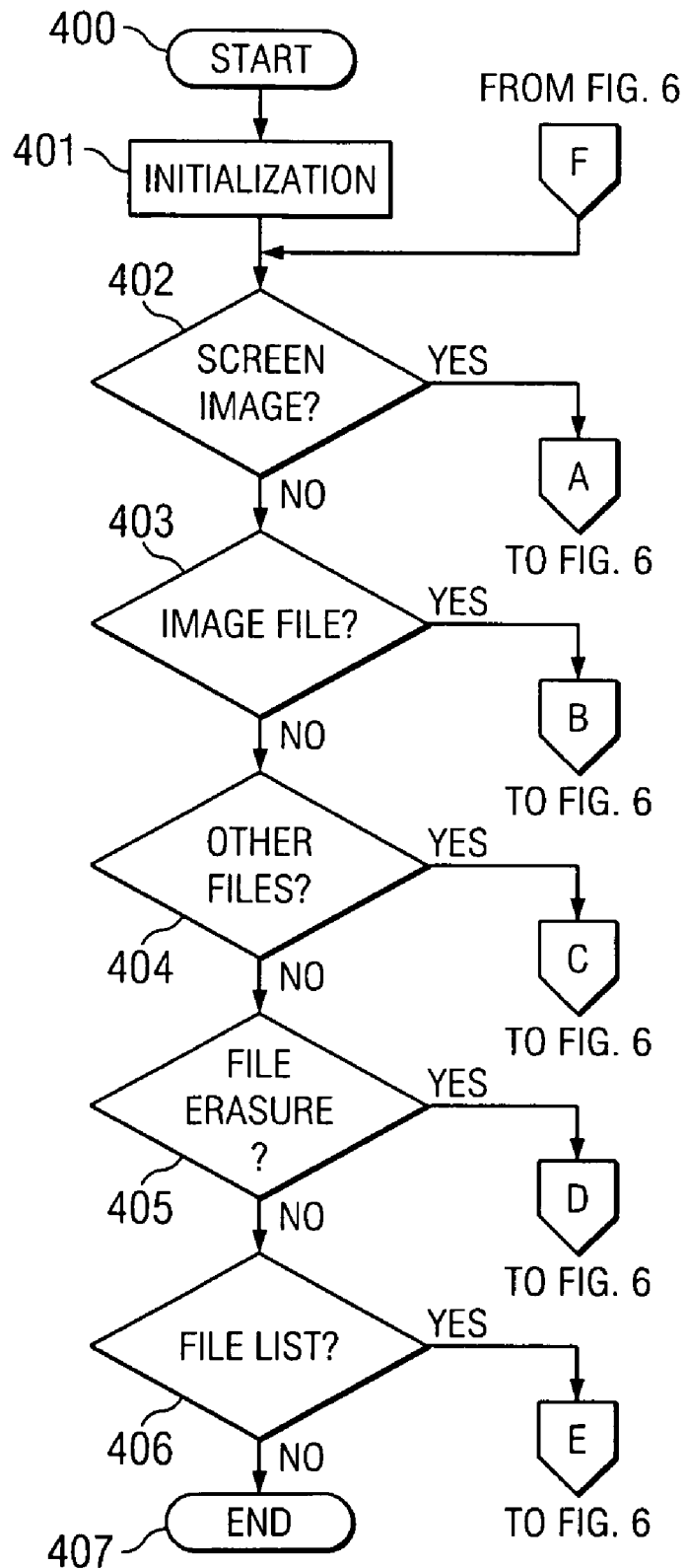

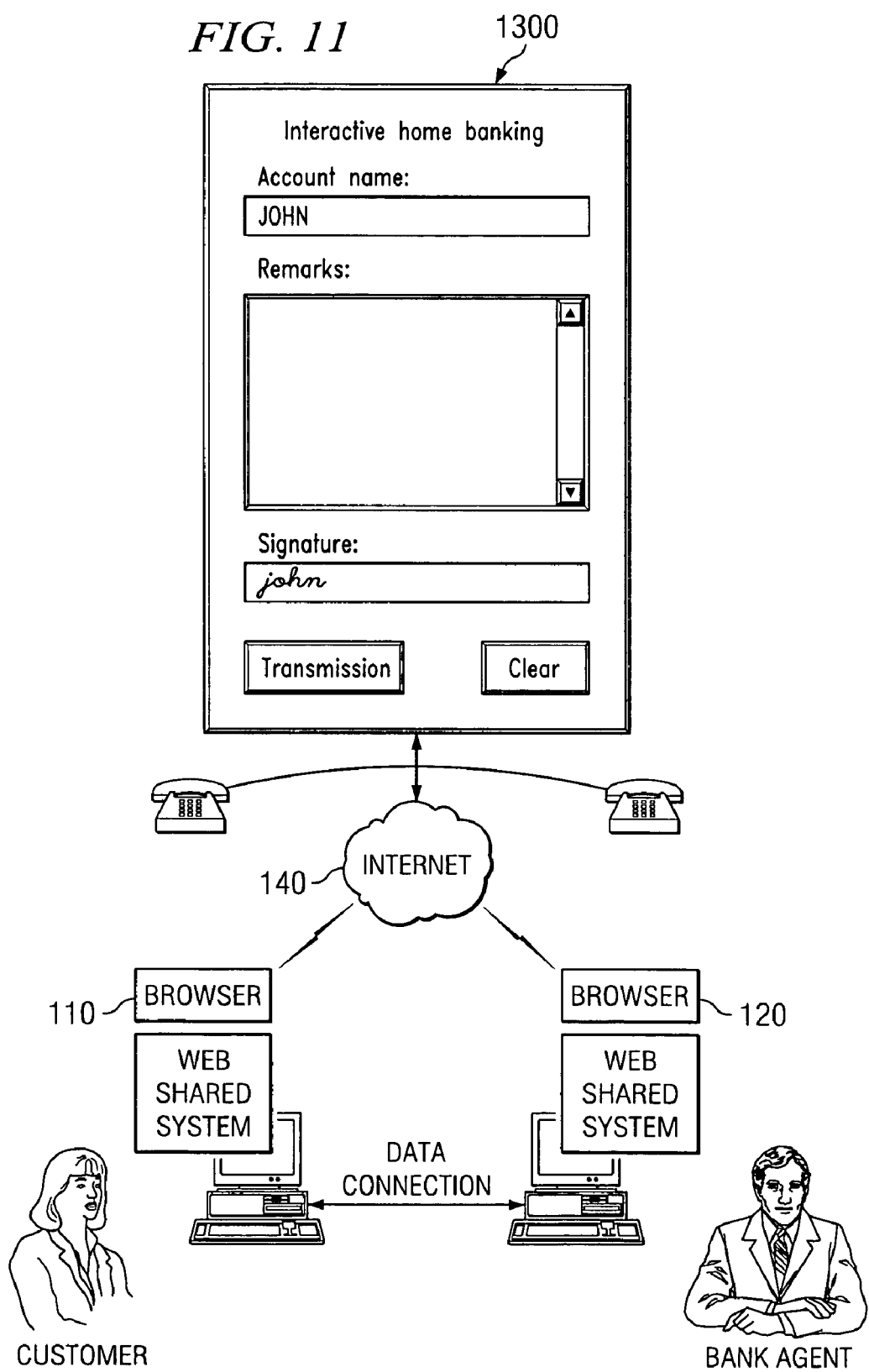

METHOD AND SYSTEM FOR COLLABORATING AMONG INTERCONNECTED CLIENT TERMINALS

FIELD OF THE INVENTION

The present invention relates to a method of information processing, and in particular to a method for sending information on the client side to the server side.

BACKGROUND OF THE INVENTION

The Internet comprises multiple computer networks interconnected so that any computer on a given network can communicate with one or plural computers on any other given network. A gateway computer is a computer interconnecting two networks and passing data from one network to another network.

All the computers on the Internet communicate via a specific communication protocol, namely the Internet Protocol. Most applications use Transmission Control Protocol (TCP) along with the Internet Protocol. Accordingly, the Internet is also called the TCP/IP network. A computer connected to the Internet is identified by a unique Internet address.

The Internet performs routing of information by using the well-known packet switching technique. On the Internet, data is transmitted via a packet with an address (also called an IP packet). General Internet applications include those incorporating electronic mail, FTP, TELNET, network news, etc. The Internet protocol and applications are well known.

World Wide Web (namely, WWW or Web) is an information service system based on the Internet. WWW uses hypertext and client/server techniques. Hypertext is a method for structuring and presenting information so that a data object in a hypertext file can have a link to another hypertext file or data object. For instance, while a hypertext page is displayed, a user can select a word which has a link. Accordingly, the user can move to another hypertext file including another text or picture to explain the word (there are cases where the new file also has a link to another hypertext file, and from then on they are linked likewise).

Currently, many of hypertext files are composed by using hypertext markup language (HTML). A hypertext data object can be almost any information medium such as text, image, speech, image sequence or an executable computer program. Any hypertext file on the Web is uniquely identified by its universal resource locator (URL).

A Web client or a client (in general, a computer which executes a program called a browser) is essentially a hypertext reader which communicates with a Web server via a specific data transfer protocol such as the hypertext transfer protocol (HTTP). A client requests a hypertext file by using the appropriate URL and displays the file (called a Web page) on a graphical user interface (GUI). A Client can also return specific data to a server and call a common gateway interface (CGI) program to perform a specific task. Currently, NETSCAPE NAVIGATOR (trademark of Netscape Communications Corporation) and INTERNET EXPLORER (trademark of Microsoft Corp.) are known as general browsers.

WWW allows a user anywhere on the Internet to send a hypertext file on WWW by using the worldwide connections of the Internet, and allows any hypertext file to be fetched as conveniently as using a local hard disk. Thus, a user is given a strong tool for acquiring information, and the Internet becomes a hypermedia global database, namely an information superhighway.

The Internet and WWW have been dramatically expanding in recent years. Companies also expect a great opportunity in the use of the Internet and WWW as a new-generation worldwide communication basis for advancing into a huge consumer market.

In such Internet technologies, there exists a technology which uses a whiteboard to refer to common information with two terminals connected with a network (http://www.vocaltec.com/iphone4/ip4.htm, etc.). However, such a technology merely sends information, to be mutually referred to, to the other party connected by using the HTTP protocol, and does not allow access to that information again after a session has ended.

Moreover, even during a session, the information cannot be accessed by a third party. In addition, since data commonly referred to is displayed on the Web browser, the number of windows displayed on a desktop can be reduced. Also, in one aspect of the present invention, each user has a unique name to be stored on a server, and thus a file created by a specific user can be specified and referred to.

In conjunction with the problems to be solved by the present invention, Japanese Unexamined Patent Publication No. Hei 10-247176 activates an application on a Web server from a client terminal side to have a running state of the application displayed on the Web browser screen of the client terminal. To utilize this technology, however, it is necessary to register an application to run on the server in advance. Also, since an application is run in compliance with a request from the client terminal, the server's burden increases. Moreover, since an application is run in response to a request from the client terminal and the result, etc. are sent to the client terminal, there are drawbacks, namely, communication time becomes longer and the load to the system increases.

On the other hand, as in Japanese Unexamined Patent Publication No. Hei 10-124461, a collaboration technology is proposed, which allows plural users to simultaneously perform collaborative work on an HTML page (access, loading or change). FIG. 11 is a diagram showing an example of applying this collaborative work on an HTML page to an Internet banking system. This technology allows an event, etc. occurred on a URL or a Web browser specified by one user to be sent to another user's terminal so that reference to a common page, etc. can be made. If this technology is used, a bank agent can refer to the same page as a customer and simultaneously have communication such as mutually confirming its contents by telephone 1365A and 1365B.

In communicating with another operator in a remote place by using such a collaboration technology, there was a request asking that a state of an application other than a Web browser is immediately shown to the other operator.

SUMMARY OF THE INVENTION

One object of the present invention is to display information existing on a client terminal onto a display screen of another client terminal by performing a simple operation.

Another object is to display information existing on a client terminal onto a display screen of another client terminal while minimizing the number of applications operating on a desktop.

A further object is to display an operating state of an application not directly related to communication onto a display screen of another client terminal connected with a network.

A still further object is to provide a computer system which does not depend on a platform of the operated information terminal.

In one aspect of the present invention, if an image displayed on a display screen of another client terminal is specified, the image is compressed to predetermined formed image data and also given a unique name in the system. This file is automatically sent to a Web server. A Web browser operating on a client terminal is automatically switched to display the file.

In another aspect of the present invention, a method of communicating on a communication system having a client terminal connecting a server through a network and collaborating with other client terminals connected to the network is provided, the method comprising the steps of: (a) generating an image file in response to specifying an image area by an operator of the client terminal; (b) acquiring an image file name from the server; (c) converting the image file to generate a predetermined formed compressed image data which has a file name relating to the image file name; (d) sending the predetermined formed compressed image data to the server; (e) displaying the predetermined formed compressed image data of the server on a Web browser on the client terminal; and (f) posting the file name of the predetermined formed compressed image data to the client terminals collaborating with the client terminal.

As used herein, "an image area" is a concept including not only "a square range specified by an operator" explained in the preferred embodiments of the present invention but also "a range currently displayed by a specific application window," etc. Moreover, while "an image file name" is a concept corresponding to "an original name" explained in the preferred embodiments of the present invention, it can suitably be a name capable of identifying an operator and is a concept including a user ID, an IP address, etc.

In a further aspect of the present invention, a method of communicating on a communication system having a client terminal connecting a server through a network is provided, the method comprising the steps of: (a) generating an image file in response to specifying image data by an operator of the client terminal; (b) determining a unique image file name on the server; (c) converting the image file to generate a predetermined formed compressed image data which has a file name relating to the unique image file name; (d) sending the predetermined formed compressed image data to the server; and (e) displaying the predetermined formed compressed image data of the server on a Web browser on the client terminal.

In a still further aspect of the present invention, a method of communicating on a communication system having a client terminal connecting a server through a network is provided, the method comprising the steps of: (a) generating an image file in response to specifying image data by an operator of the client terminal; (b) converting the image file to generate a predetermined formed compressed image data; (c) sending the predetermined formed compressed image data to the server; (d) determining a unique image file name on the server and posting it to the client terminal; and (e) displaying the predetermined formed compressed image data of the server on a Web browser on the client terminal.

In a still further aspect of the present invention, a method of communicating on a communication system having a client terminal connecting with a network and a server connecting with the network and storing a file created by an operator of the client terminal which has a name capable of determining that it was created by the operator is provided, the method comprising the steps of: (a) receiving a message sent from the client terminal including information capable of identifying the operator; (b) acquiring the information capable of identifying the operator included in the message; (c) acquiring the file name of the file created by the operator based on the information capable of identifying the operator; (d) generating a file list file by inserting the file name into a skeleton file; and (e) posting the file name of the file list file to the client terminal.

In the claims of the specification of the present invention, while "information capable of identifying an operator" is a concept corresponding to "an original name" explained in the preferred embodiments of the present invention, it can suitably be a name capable of identifying an operator and is a concept including a user ID, an IP address, etc.

In a still further aspect of the present invention, a client terminal connecting a server through a network and collaborating with other client terminals connected to the network is provided, the client terminal comprising: (a) a screen range selector for specifying a screen range in response to operation for specifying screen range by an operator; (b) an image file generator for acquiring an image according to the screen range and generating an image file; (c) a file name acquisition division for acquiring an original name from the server; (d) an image file converter for converting the image file to generate a predetermined formed compressed image data; (e) a file transmitter for sending to the server the predetermined formed compressed image data which has a file name relating to the original name; and (f) a display division for displaying the predetermined formed compressed image data of the server on a Web browser on the client terminal.

In a still further aspect of the present invention, a server connecting a client terminal through a network and storing a file created by an operator of the client terminal which has a file name capable of determining that it was created by the operator is provided, the server comprising: (a) a message analysis division for receiving a message sent from the client terminal including information capable of identifying the operator and acquiring the information; and (b) a file list generator for acquiring the file name of the file created by the operator based on the information, generating a file list file by inserting the file name into a skeleton file; and posting the file name of the file list file to the client terminal.

In a still further aspect of the present invention, a communication system having a first and a second client terminals connecting with a network and a server connecting the first and a second client terminals through the network is provided, the communication system comprising: the first client terminal comprising: (a1) an image file generator for, in response to operation for specifying a screen range by an operator, generating an image file according to the operation; (a2) a file name acquisition division for acquiring an original name from the server; (a3) an image file converter for converting the image file to generate a predetermined formed compressed image data; (a4) a file transmitter for sending to the server the predetermined formed compressed image data which has a file name relating to the original name; and (a5) a display division for displaying the predetermined formed compressed image data of the server on a Web browser on the first client terminal and posting the name of the predetermined formed compressed image data to the second client terminal, and (b) a server comprising a file name generator for generating an original name capable of uniquely identifying the first client terminal in response to a request from the first client terminal and posting it to the first client terminal; and (c) the second client terminal for displaying the predetermined formed compressed image data of the server on a Web browser on the second client terminal based on the name of the predetermined formed compressed image data sent from the first client terminal.

In a still further aspect of the present invention, a storage medium storing a software product for connecting a server through a network and controlling communication performed on a communication system having a client terminal collaborating with other client terminals connected to the network is provided, the software product comprising the program codes for: (a) directing the client terminal to generate an image file in response to specifying an image area by an operator of the client terminal; (b) directing the client terminal to acquire an image file name from the server; (c) directing the client terminal to convert the image file and generate a predetermined formed compressed image data which has a file name relating to the image file name acquired from the server; (d) directing the client terminal to send the predetermined formed compressed image data to the server; (e) directing the client terminal to display the predetermined formed compressed image data of the server on a Web browser on the client terminal; and (f) directing the client terminal to post the file name of the predetermined formed compressed image data to the client terminals collaborating with the client terminal.

In a still further aspect of the present invention, a storage medium storing a software product for controlling communication performed on a communication system having a client terminal connecting a server through a network is provided, the software product comprising the program codes for: (a) directing the client terminal to generate an image file in response to specifying image data by an operator of the client terminal; (b) directing the client terminal to determine a unique image file name on the server; (c) directing the client terminal to convert the image file and generate a predetermined formed compressed image data which has a file name relating to the image file name acquired from the server; (d) directing the client terminal to send the predetermined formed compressed image data to the server; and (e) directing the client terminal to display the predetermined formed compressed image data of the server on a Web browser on the client terminal.

In a still further aspect of the present invention, a storage medium storing a software product for controlling communication performed on a communication system having a client terminal connecting a server through a network is provided, the software product comprising the program codes for: (a) directing the client terminal to generate an image file in response to specifying image data by an operator of the client terminal; (b) directing the client terminal to convert the image file and generate a predetermined formed compressed image data; (c) directing the client terminal to send the predetermined formed compressed image data to the server; (d) directing the client terminal to determine a unique image file name on the server and post it to the client terminal; and (e) directing the client terminal to display the predetermined formed compressed image data of the server on a Web browser on the client terminal.

In a still further aspect of the present invention, a storage medium storing a software product for controlling communication performed on a communication system having a client terminal connecting with a network and a server connecting with the network and storing a file created by an operator of the client terminal which has a file name capable of determining that it was created by the operator is provided, the software product comprising the program codes for: (a) directing the server to receive a message sent from the client terminal including information capable of identifying the operator; (b) directing the server to acquire the information capable of identifying the operator included in the message; (c) directing the server to acquire the file name of the file created by the operator based on the information capable of identifying the operator; (d) directing the server to generate a file list file by inserting the file name into a skeleton file; and (e) directing the server to post the file name of the file list file to the client terminal.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 5 is a flowchart explaining a procedure on a client terminal side in a preferred embodiment of the present invention;

FIG. 11 is a flowchart for explaining a conventional collaboration technology.

DETAILED DESCRIPTION OF THE INVENTION

A. Overview

Figure 1:
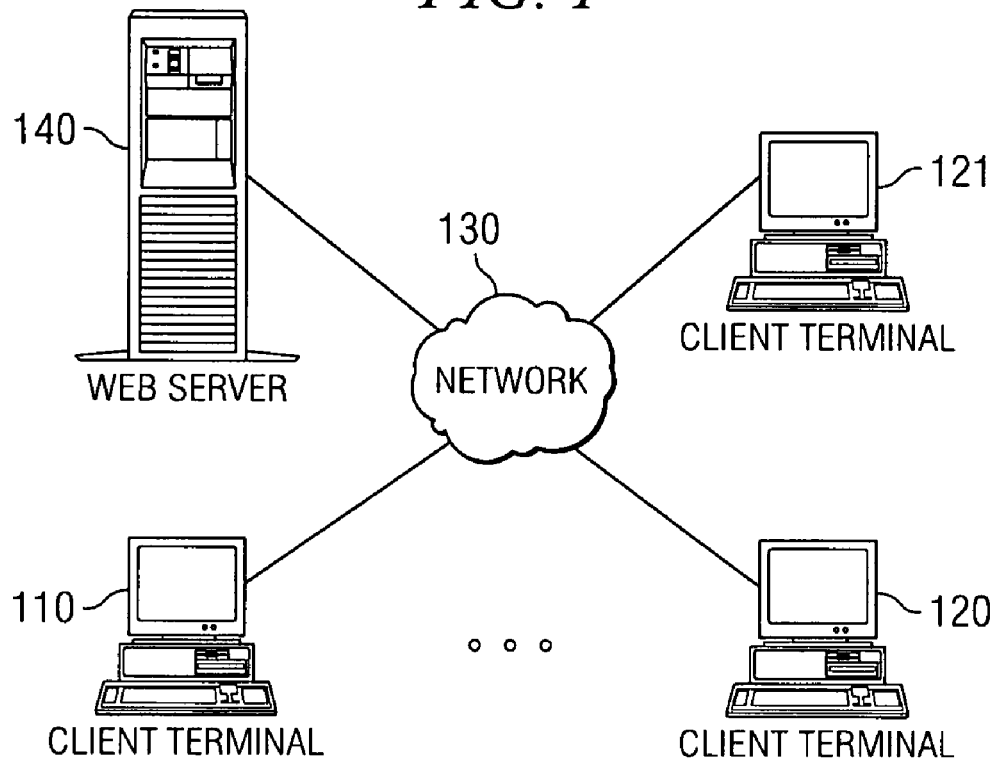
FIG. 1 is a conceptual diagram of an information processing system in a preferred embodiment of the present invention.

FIG. 1 is a conceptual diagram of a data processing system in a preferred embodiment of the present invention. On information terminals 110 and 120 on the client side, Web browsers such as NETSCAPE NAVIGATOR (a trademark of Netscape Communications Corporation) and INTERNET EXPLORER (a trademark of Microsoft Corp.), etc. are installed. The operator of client terminal 110 selects an image and a file displayed on a desktop after moving processing elements of the present invention, and then the data processing system of the present invention determines a unique image file name in the system and generates predetermined formed compressed image data.

The compressed image data is sent to Web server 140, and then the Web browser's location is changed to a URL including this file and displayed. In one aspect of the present invention, this URL is also posted to another collaborating client terminal 120 so that the file sent to Web server 140 can be displayed. If accessed by specifying the URL, this file can also be referred to from client terminal 121 which is not collaborating.

B. Hardware Configuration

Figure 2:
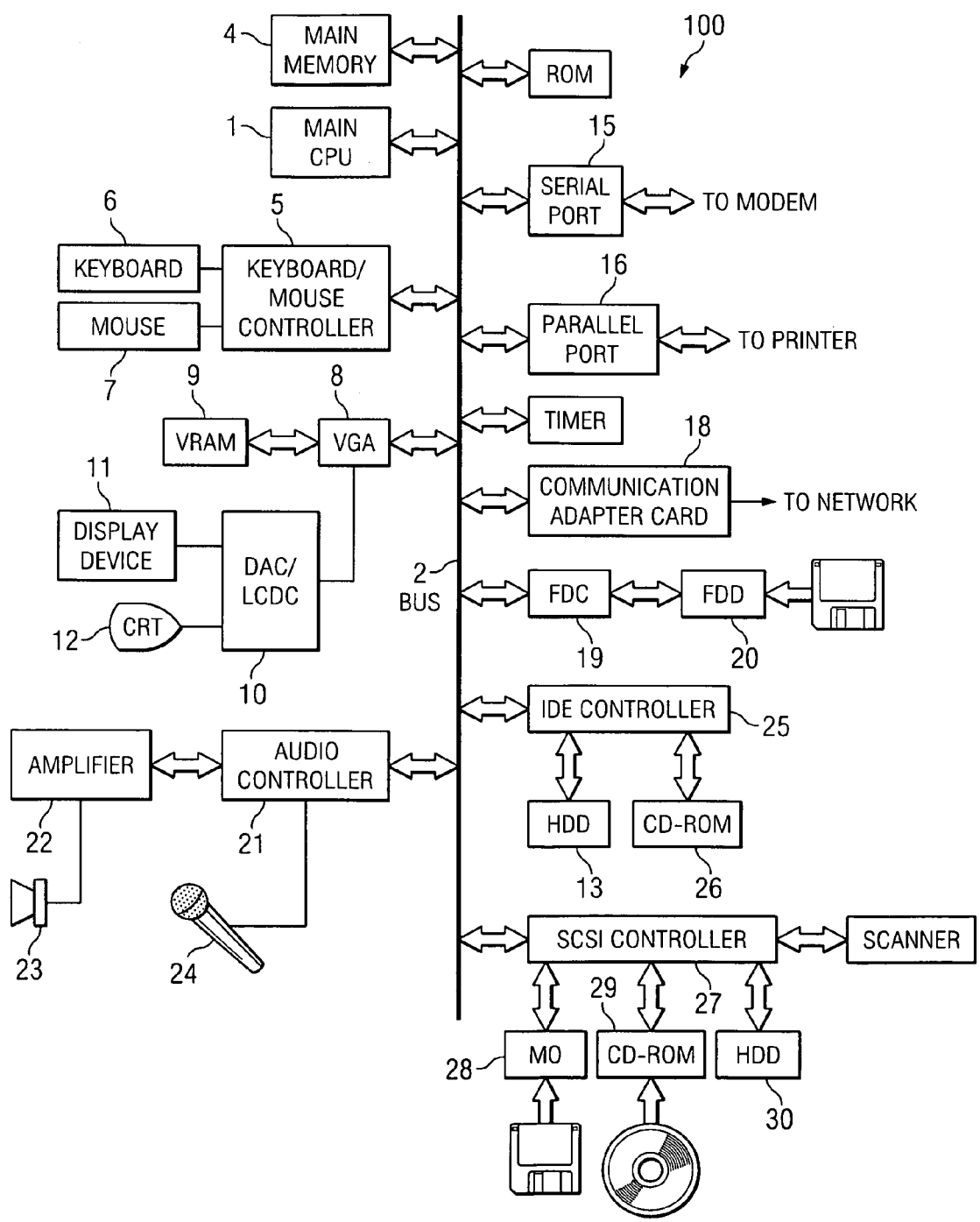
FIG. 2 is a block diagram showing an embodiment of hardware configuration of a client terminal or a server in the present invention.

FIG. 2 is an overview showing an embodiment of hardware configuration of client terminals 110, 120 and Web server 140 used in the present invention. Client terminals 110, 120 and Web server 140 comprise central processing unit (CPU) 1 and memory 4. CPU 1 and memory 4 are connected via bus 2 with hard disk device 13 as auxiliary storage. Floppy-disk drive 20 (or drives for storage media such as CD-ROM drive 26, magneto-optical drive (MO) 28, or CD-ROM drive 29) is connected with bus 2 via floppy-disk controller 19 (or IDE controller 25, SCSI controller 27, etc.).

A floppy disk (or a storage medium such as an MO or a CD-ROM) is inserted into floppy-disk drive 20 (or appropriate drives 26, 28, or 29). Code of a computer program for giving instructions to a CPU in synergy with an operating system to implement the present invention can be recorded on storage media for execution by being loaded to memory 4. This code can also be compressed or divided so as to be recorded on two or more media.

Client terminals 110, 120 and Web server 140 can also have user interface hardware including pointing device 7 (a mouse, a joystick etc.) or keyboard 6 and CRT 12 or other display 11. A touch panel can also be a means for entry. It is also possible to connect with a printer via parallel port 16 or a modem via serial port 15. This information terminal support server 100 can be connected with a network via serial port 15 and a modem or communication adapter 18 (Ethernet or Token-ring card) etc. so as to communicate with other computers and so on.

Speaker 23 receives a speech signal which is D/A (digital/analog) converted by audio controller 21 via amplifier 22 and provides output as speech. In addition, audio controller 21 makes it possible to convert speech information received from microphone 24 and capture into the system speech information outside the system.

Thus, it may be easily understood that client terminals 110, 120 and Web server 140 in the present invention are implemented by information terminals with a communication facility including an ordinary personal computer (PC) or a workstation, a notebook PC, a palmtop PC, a network computer, etc. or a combination of these. However, these components are taken as examples, and it does not follow that all of them are required components of the present invention.

In particular, since the hardware configuration explained here also includes the items not required for control on a client terminal such as specifying a screen area or a file and sending it to a server, a client terminal can do without audio controller 21, amplifier 22, speaker 23 and microphone 24 required for speech processing, and keyboard 6, mouse 7, keyboard/mouse controller 5, various record medium processors 19, 25, 27, etc. allowing direct entry from an operator.

Also, a server can do without audio controller 21, amplifier 22, speaker 23 and microphone 24 required for speech processing, keyboard 6, mouse 7, keyboard/mouse controller 5 allowing direct entry from an operator, and CRT 12, display 11, VRAM 9, VGA 8, various record medium processors 19, 25, 27, etc. for presenting visual data to a user. As for the components of client terminals 110, 120 and Web server 140, various changes can be easily assumed by this trader including combination of plural machines for allotting and implementing functions among them, and such changes are the concepts incorporated in the philosophy of the present invention.

An operating system for client terminals 110, 120 and Web server 140 can be implemented by those supporting a GUI multi window environment as a standard such as Windows NT (a trademark of Microsoft Corp.), Windows 9x (a trademark of Microsoft Corp.), Windows 3.x (a trademark of Microsoft Corp.), OS/2 (a trademark of IBM Corp.), MacOS (a trademark of Apple Corp.) and X-WINDOW system (a trademark of MIT) on AIX (a trademark of IBM Corp.), those of character-based environments such as PC-DOS (a trademark of IBM Corp.) and MS-DOS (a trademark of Microsoft Corp.), real time operating systems such as OS/Open (a trademark of IBM Corp.) and VxWorks (a trademark of Wind River Systems, Inc.), and operating systems incorporated in a network computer such as JavaOS, and thus it is not limited to a specific operating system environment.

C. System Configuration

Figure 3:
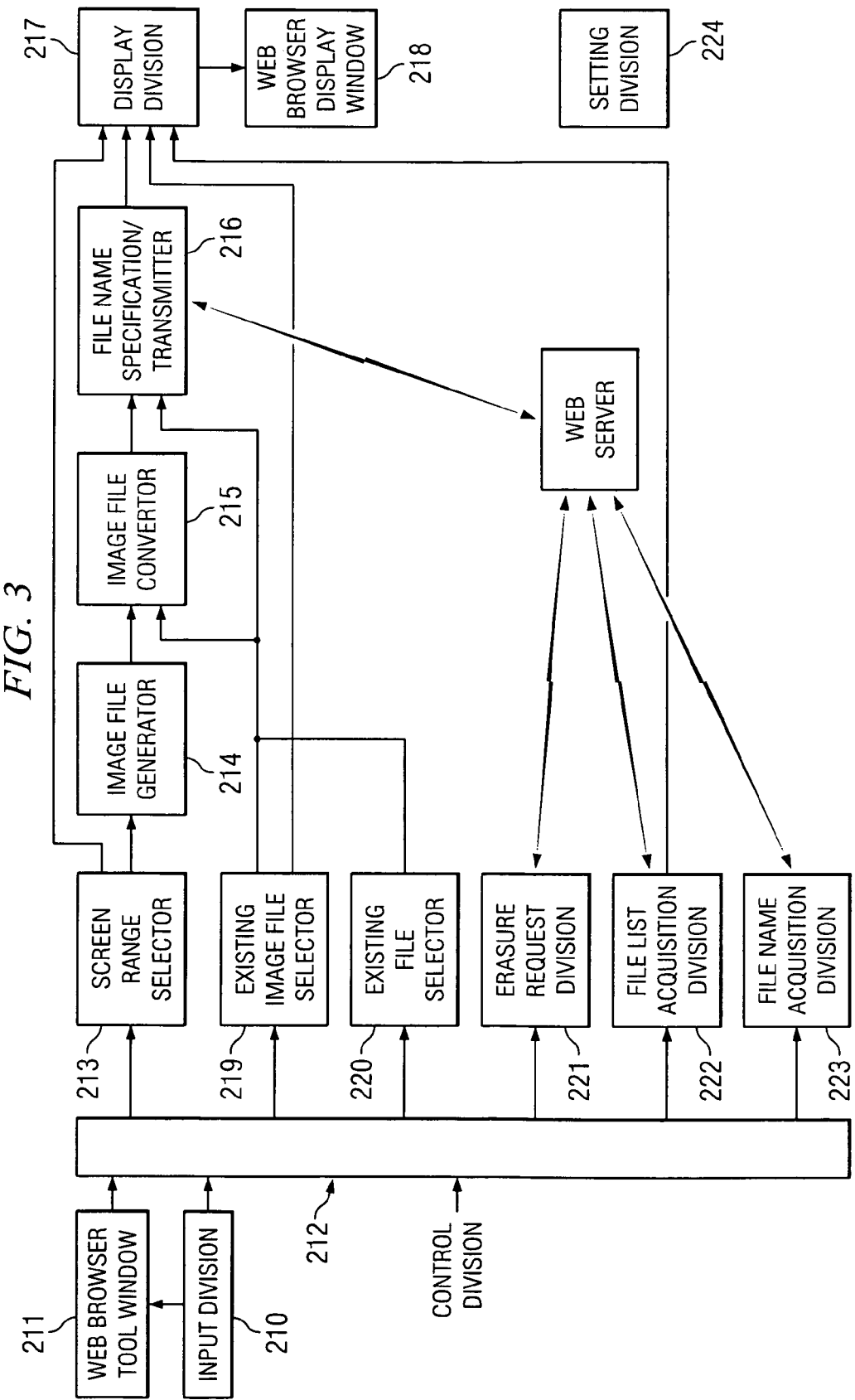
FIG. 3 is a block diagram of processing elements on a client terminal side in a preferred embodiment of the present invention.

FIG. 3 is a functional block diagram showing a system configuration of client terminals 110 and 120 in a preferred embodiment of the present invention. A client terminal has Web browser 211, control division 212, screen range selector 213, image file generator 214, image file converter 215, file name specification/transmitter 216, display division 217, Web browser display window 218, existing image file selector 219, existing file selector 220, erasure request division 221, file list acquisition division 222, file name acquisition division 223 and setting division 224.

Web browser 211 sends a request to Web server 140 and also receives a response sent from Web server 140 to display on a display screen. Control division 212 provides an input area for an operator to select a function of the present invention and also performs flow management when each of the processing components implement the procedure of the present invention.

Screen range selector 213 identifies a screen area specified by an operator via input division 210. It also passes to display division 217 coordinate data, etc. to visually display an identified screen area. Image file generator 214 generates an image file by acquiring image data of the screen area specified by screen range selector 213.

Image file converter 215 converts an image file generated by image file generator 214 into a file format specified by an operator via input division 210. File name specification/transmitter 216 posts a file name acquired by file name acquisition division 223 to other collaborating client terminals and display division 217.

Display division 217 controls Web browser display window 218 to browse the file name posted by file name specification/transmitter 216. Web browser display window 218 acquires specified URL data and displays it on the display screen.

Existing image file selector 219 performs control for having an operator select an image file existing on client terminal 110. Existing file selector 220 performs control for having an operator select a file in a format other than an image file existing on client terminal 110.

Erasure request division 221 performs control for erasing a file from Web server 140 specified by an operator via input division 210. File list acquisition division 222 performs control for acquiring a file list existing on Web server 140.

File name acquisition division 223 requests Web server 140 to give a unique name in the system and acquires a file name sent from Web server 140. In a preferred embodiment of the present invention, file name acquisition division 223 is activated when an operation of file selection such as screen range selection, image file selection or any other file selection is first performed after control division 212 is activated, and it requests Web server 140 to generate a file name. Moreover, it passes the file name acquired from Web server 140 to control division 212. Setting division 224 performs initialization, etc. when this client terminal 110 is activated.

Figure 4:
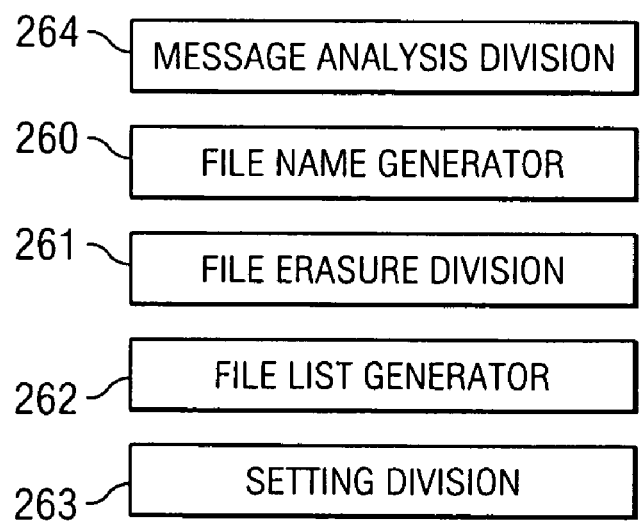
FIG. 4 is a block diagram of processing elements on a server side in a preferred embodiment of the present invention.

FIG. 4 is a functional block diagram showing a system configuration of Web server 140 in a preferred embodiment of the present invention. Web server 140 has message analysis division 264, file name generator 260, file erasure division 261, file list generator 262 and setting division 263.

File name generator 260 generates a unique name in the system in response to a file name generation request sent from file name acquisition division 223 of client terminal side 110, and sends it in a format of a file name generation response to file name acquisition division 223.

File erasure division 261 performs file erasure in response to a file erasure request sent from file erasure request division 221 of client terminal side 110 and sends its status to the file erasure request division.

File list generator 262, in response to a file list generation request sent from file list acquisition division 222 of client terminal side 110, acquires a listing of files managed by a client that sent the request, generates a file list and sends it in a format of a file list generation response to file list acquisition division 222.

Setting division 263 performs initialization, etc. when this Web server 140 is activated. Message identification division 264 identifies the type of message sent from the client side.

While each of the functional blocks shown in FIGS. 3 and 4 were explained as above, these are logical functional blocks, and each of them is meant to be implemented not by one integrated hardware and software but by combined or common hardware and software. Also, it does not mean that all the functional blocks shown in these FIGS. 3 and 4 are the components required for the present invention.

For instance, in a form wherein, as a method, it is not that the file name acquisition division acquires an original name in advance and determines a file name based on this original name, but that a file name sent by file name specification/transmitter 216 is converted into a unique file name in the system on the server side and it is posted to the client terminal side, file name acquisition division 223 is not necessary.

D. Operating Procedure

Figure 6:
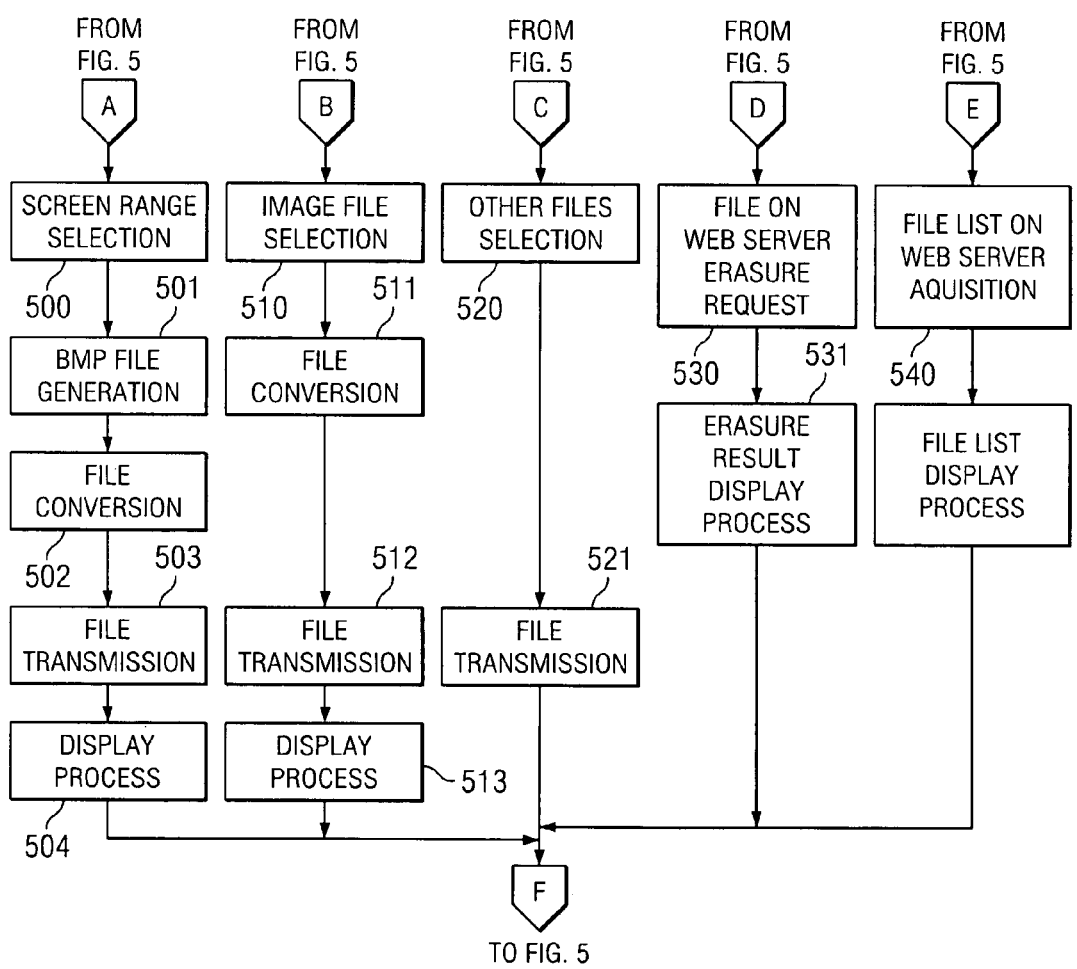
FIG. 6 is a flowchart explaining a procedure on a client terminal side in a preferred embodiment of the present invention.

The operating procedure of each processing element of client terminals 110 and 120 in a preferred embodiment of the present invention is shown in FIGS. 5 and 6.

As shown in FIG. 5, the procedure starts with step 400. First, if the system is activated, processing elements of the present invention are activated and various initialization is performed (step 401). In response to operator input, control division 212 (FIG. 3) is activated.

Figure 8:
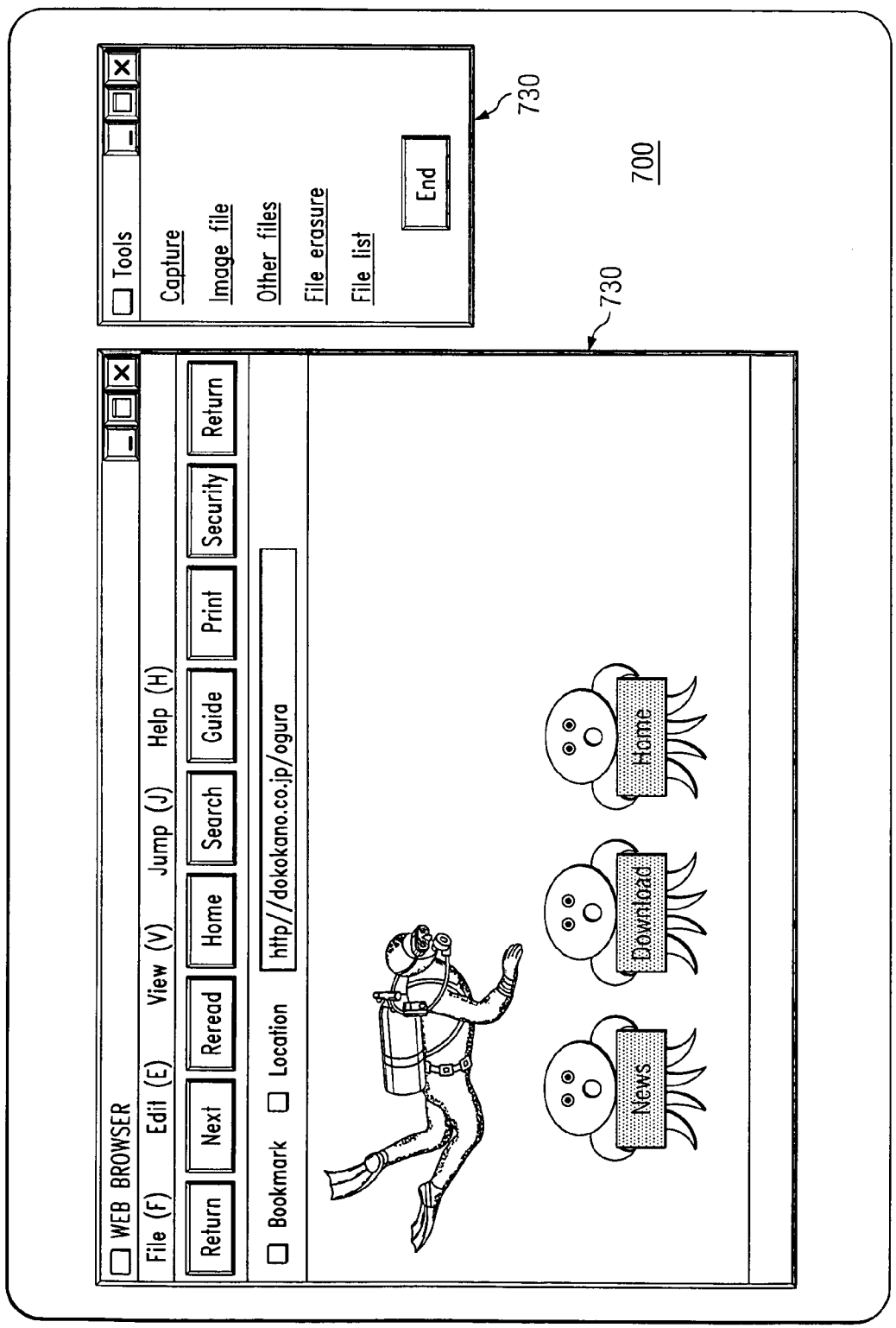
FIG. 8 is a diagram showing a display screen of a client terminal in a preferred embodiment of the present invention.

Control division 212 in a preferred embodiment of the present invention provides a function for an operator to input selection of the screen image transmission process (step 402), the existing image file transmission process (step 403), the other existing file transmission process (step 404), the file erasure process (step 405), the file list acquisition process (step 406) and the end (step 407) (FIG. 8). If the operator selects these functions, software related to thereto is activated.

D-1. Screen Image Transmission Procedure

If control division 212 determines that an operator input is a screen image transmission process, screen range selector 213 specifies an image on a desktop by a "rubber-band range specification function" or a "square-frame-highlighting window selection function", etc. (step 500, FIG. 6).

D-1-1. Rubber-Band Range Specification Function

In one aspect of the preferred embodiments of the present invention, control division 212 has a rubber-band range specification function. If it is determined that an operator input is a screen image transmission process, and the left mouse button is pressed and the mouse pointer is moved, this rubber-band range specification function shows a rubber band on a display screen. The operator performs an operation of moving the mouse pointer to expand the rubber band to the range to be cut as an image and then pressing the left mouse button once.

Moreover, in one aspect of the preferred embodiments of the present invention, width and height of an image to be cut are also displayed in response to the mouse pointer's movement. Furthermore, while in a preferred embodiment of the present invention, the range to be cut is specified by pressing the left mouse button and moving the mouse pointer and then pressing the left mouse button once more, the range can also be specified by an operation such as a drag and release.

To be specific, screen range selector 213 temporarily stores the mouse pointer's coordinate value first in response to a click of the left mouse button, and then acquires the mouse pointer's coordinate value to where it is moved in response to detection of the mouse pointer's movement. Based on such information, it generates information to display a square frame which is sent to display division 217. Thus, a square frame which expands and reduces in response to the mouse pointer's movement is displayed on the display screen.

If a range to be cut is decided by this operation, in a preferred embodiment of the present invention, screen range selector 213 further highlights the square selected by the rubber band (changes a display attribute of the square frame) and shows a pop-up menu to have the operator select "1: Capture", "2: Redo" or "3: Terminate".

If the operator selects "1: Capture", a bit map file is generated in image file generator 214 (step 501). To be specific, a bit map file is generated in the following procedure:

1. First, in the case of cutting based on range specification, a device context of a desktop window is acquired.

2. A memory device context compatible with this desktop window device context is generated.

3. A bit map of range-specified size (in the case of a window, window size) corresponding to this memory device context is generated in memory.

4. Of the bit map of the desktop window device context, the range-specified part is copied to the memory device context.

5. The bit map is converted into a device independent bit map by utilizing a clipboard.

6. A bit map file is generated by writing in a file a Bitmap file header and the device independent bit map.

The bit map file generated in the image file generator is converted into a JPEG file, a GIF file, etc. in image file converter 515 (step 502). Moreover, the file format to be converted into may be a format specified by an operator.

In a preferred embodiment of the present invention, a file name on a Web server is a unique name on this system capable of proving that it was generated by a function of the present invention. For instance, if a name acquired in advance by file name acquisition division 223 on a Web server (an original name) is X, it can be named by using a formula: ("dpImg"+X+a serial number), etc.

Moreover, in a preferred embodiment of the present invention, while an original name is acquired in advance from Web server 140 and a file name is determined each time a file is sent to Web server 140 in order to reduce traffic of client terminal 110 and Web server 140, it is also possible to adopt a method for converting a file name sent by file name specification/transmitter 216 into a unique file name in the system on the server side and posting it to the client terminal side.

The converted file is sent to the Web server by file name specification/transmitter 216. In a preferred embodiment of the present invention, this transmission is performed by using a method set by setting division 224 (a PUT method of HTTP or FTP, etc.) (step 504).

Display division 217 changes a URL of Web browser display window 218 to "an HTML including a transmitted file" and displays an image (step 504).

D-1-2. Square-Frame-Highlighting Window Selection Function

In another aspect in a preferred embodiment of the present invention, a screen area is specified by using the square-frame-highlighting window selection function. If this function is used, when an operator moves a mouse, a frame of a visible window under it is highlighted. And if the operator moves the mouse on the window to be acquired and presses the right mouse button, and in the case that a part of the subject window is hidden under another window, all of it is displayed with its frame further highlighted. And just as in "D-1-1. Rubber-band range specification function", a pop-up menu for selecting "1: Capture", "2: Redo" or "3: Terminate" is displayed. The operator selects it by the right mouse button.

In such an operation, in response to detection of the mouse pointer's movement, screen range selector 213 inquires of the window system about visible window size and position of an application closest to the current mouse pointer's position so as to display a square corresponding to the window frame. While this square corresponding to the window frame can be directly rendered on a desktop, it is also possible to generate a transparent window and render the square on it. After that, in response to detection of pressing of the right mouse button, it displays in front a window of an application closest to the current mouse pointer's position and also highlights a square corresponding to the window frame.

If the operator selects "1: Capture", a bit map file is generated in image file generator 214 (step 501). To be specific, it is almost the same as "D-1-1. Rubber-band range specification function" except that, in the case of window specification, a device context of the subject window rather than a device context of the desktop window is acquired.

D-1-3. Capture Suspend/Resume Function for Displaying Another Application

In a preferred embodiment of the present invention, a capture suspend/resume function for displaying another application is provided as an additional function. As the mouse is captured when screen range selector 213 is activated, only the images currently displayed on a desktop are the subjects for acquisition. In order to acquire an application yet to be activated, a hidden window image and a full-screen display application image, a range selection process can be suspended and resumed by an operation such as Windows hot key (default: Capture suspend: Shift+X, Capture resume: Shift+C), etc. The hot key can be changed by setting division 224.

D-1-4. Full-Screen Display Application Image Size Restore Function

In a preferred embodiment of the present invention, a full-screen display application image size restore function is further provided as an additional function. It is a function wherein, if capture is performed making the subject window a full-screen window in order to capture a full-screen image of an application, the subject window is automatically restored to its original size after the capture is performed. In a preferred embodiment of the present invention, it is implemented by screen range selector 213 sending a restore command to the window system.

D-2. Existing Image File Transmission Procedure

In the existing image file transmission procedure in a preferred embodiment of the present invention, existing image file selector 219 displays a dialog for file selection, and extracts and displays files of the file extensions (BMP, GIF, JPG) existing in a specified directory of a client terminal (step 510). If a file is selected by an operator, the file is accessed and converted into a predetermined file format (step 511). In a preferred embodiment of the present invention, in the case of a bitmap file, image file converter 215 converts the file into a file of GIF or JPG format.

And just as in the procedure of "D-1-1. Rubber-band range specification function", it is sent to a Web server with a unique name in the system and is displayed on a Web browser (steps 512 and 513).

D-3. Other Existing File Transmission Procedure

The other existing file transmission function can be used to send various files on a Web server. In a preferred embodiment of the present invention, it is possible to control who can access the file then. First, it is possible to specify that only those performing Web browser collaboration can access it (hereafter called private) or that anyone capable of accessing this system can access it (hereafter called public).

D-3-1. Private

An operator can use existing file selector 220 to display a dialog for file selection and select a file (step 520). The file is sent to a Web server by file name specification/transmitter 216. It is sent by a method set by setting division 224 (a PUT of HTTP or FTP) (step 521).

In that case, a file name on a Web server must be a unique name on this system capable of proving that it was generated by this function, and also capable of determining that it is private. For instance, if a name acquired in advance by file name acquisition division 223 on a Web server is X, it can be named by using a formula: ("dpPrivate"+X+a serial number), etc.

It is also possible to create and send a table file associating information such as original names of transmitted files with unique names given here. This is because, in the process of acquiring a file list mentioned later, it is not possible to distinguish contents of unfamiliar names allocated in the system even if they are listed. For instance, a file can be named by using a formula: ("dpFileInfo"+X). In a preferred embodiment of the present invention, this one file exists in a session of Web browser collaboration (hereafter, from a start to an end of PC collaboration is called a session).

D-3-2. Public

An operator can, as in the case of private, use existing file selector 220 to display a dialog for file selection and select a file. The selected file is sent to Web server 140 by file name specification/transmitter 216. In a preferred embodiment of the present invention, it is sent by a method set by setting division 224 (a PUT method of HTTP or FTP, etc.).

A file name on a Web server must be a unique name on this system capable of proving that it was generated by this function, and also capable of identifying that it is public. For instance, if a name acquired in advance by file name acquisition division 223 on a Web server is X, it can be named by using a formula: ("dpPublic"+an original file name ("." is changed to "_")+X), etc.

D-4. File Erasure Procedure

If an operator activates file erasure request division 221, file erasure request division 221 displays entries for entering the name X acquired in advance by file name acquisition division 223 and selecting an image, a file (private) or a file (public) (plural combinations are also possible). The information entered in these entries is sent to Web server 140 as a servlet (step 530).

Web server 140 receives the servlet and activates file erasure division 261 and then erases an applicable file to return the result to the client server side. File erasure request division 221 displays the result by a method such as a dialog box (step 531).

In addition, file erasure division 261 on Web server 140 can perform a process of automatically erasing a file past the time set by a timer. The time and files to be erased, etc. can be set in advance in setting division 263 of Web server 140.

D-5. File List Acquisition Procedure

If an operator activates file list acquisition division 222, entries are displayed for entering the name X acquired in advance by file name acquisition division 223 and selecting private or public (plural combinations are also possible). The information entered in these entries is sent to Web server 140 as a servlet (step 540).

Web server 140 receives it and activates file list generator 262 and then generates an HTML file with a link to an applicable file to return its URL to client terminal 110 which sent the request.

File list acquisition division 222 on client terminal 110 posts the URL to display division 217. Display division 217 acquires it and directs Web browser display window 218 to display this URL.

D-6. Termination

In a preferred embodiment of the present invention, if termination is selected by an operator and in the case that a file was transmitted in this session, the "erasure of subject files on Web server" function is automatically performed. It is also possible to set a parameter, etc. in setting division 224 whether to perform it or not.

E. Operating Procedure of Web Server

Figure 7:
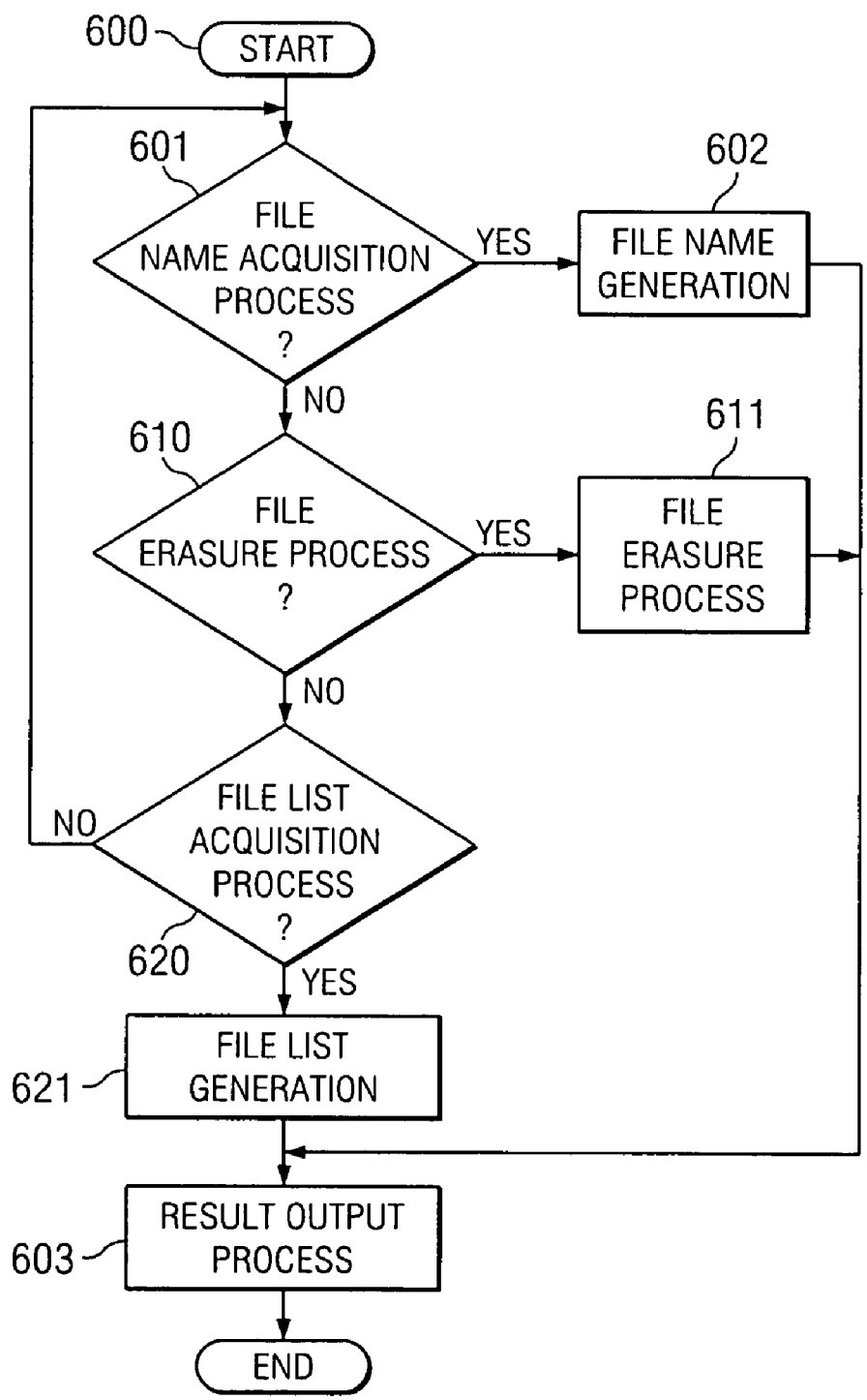
FIG. 7 is a flowchart explaining a procedure on a Web server side in a preferred embodiment of the present invention.

The operating procedure of each processing element of Web server 140 in a preferred embodiment of the present invention is shown in FIG. 7. Web server 140 starts the procedure of the present invention in response to receiving a message from client side terminal 110 (or 120) (step 600). When Web server 140 receives a message from a client terminal 110, message analysis division 264 analyzes if the message is a file name generation request (step 601), a file erasure request (step 610) or a file list generation request (step 620). Message analysis division 264 in a preferred embodiment of the present invention also checks whether a user who sent a message is authorized to perform a process according to the request.

If an analyzed request is a file name generation request, a file name generation process is performed (step 602). In a preferred embodiment of the present invention, a file name meeting the following conditions is generated: 1. A unique name in the system; 2. A neighboring user cannot imagine it; and 3. A stranger cannot easily imagine it.

For instance, a file name meeting the above conditions can be generated by the following method.

Original string: XXXXXXXXXXn

XXX . . . : 10 bytes of characters randomly selected from the following 64 bytes of characters are generated.

n: 0 to MAX_INT (a serial number in the system)

"+−ABCDEFGHIJKLMNOPQRSTUVWXYZ0123456789 abcdefghijklmnopqrstuvwxyz".

Here, an original name is acquired by encoding the original string with Base64 encoding and the above 64 characters. The 64 characters shown here are just an example, and any character string can be used as long as it is usable for a file name.

If an analyzed request is a file erasure request, a file erasure process is performed (step 611). Namely, a file with a file name specified and included in the message by a user is searched and erased. If an analyzed request is a file list generation request, a file list generation process is performed (step 621).

As a concrete procedure in a preferred embodiment of the present invention, file list acquisition division 222 of client terminal 110 sends out a servlet to a server. Web server 140 receives it and then uses message analysis division 264 to determine that the message requests execution of a procedure of the present invention and also requires generation of a file list.

And it activates file list generator 262 to extract an original name included in the message and retrieve a file including the original name. As a result of retrieval, an HTML file is generated by inserting a discovered file in a skeleton file prepared in advance. And a URL of the HTML file is included in a message to be posted to the client terminal side.

In a preferred embodiment of the present invention, a file name of this file list is a unique name on this system capable of proving that it was generated by this function. For instance, it can be named by input X and a formula: ("dpList"+X).

The processing results of each processing division 260, 261 and 263 are returned to client terminal 110 which sent the request (step 603).

Figure 9:
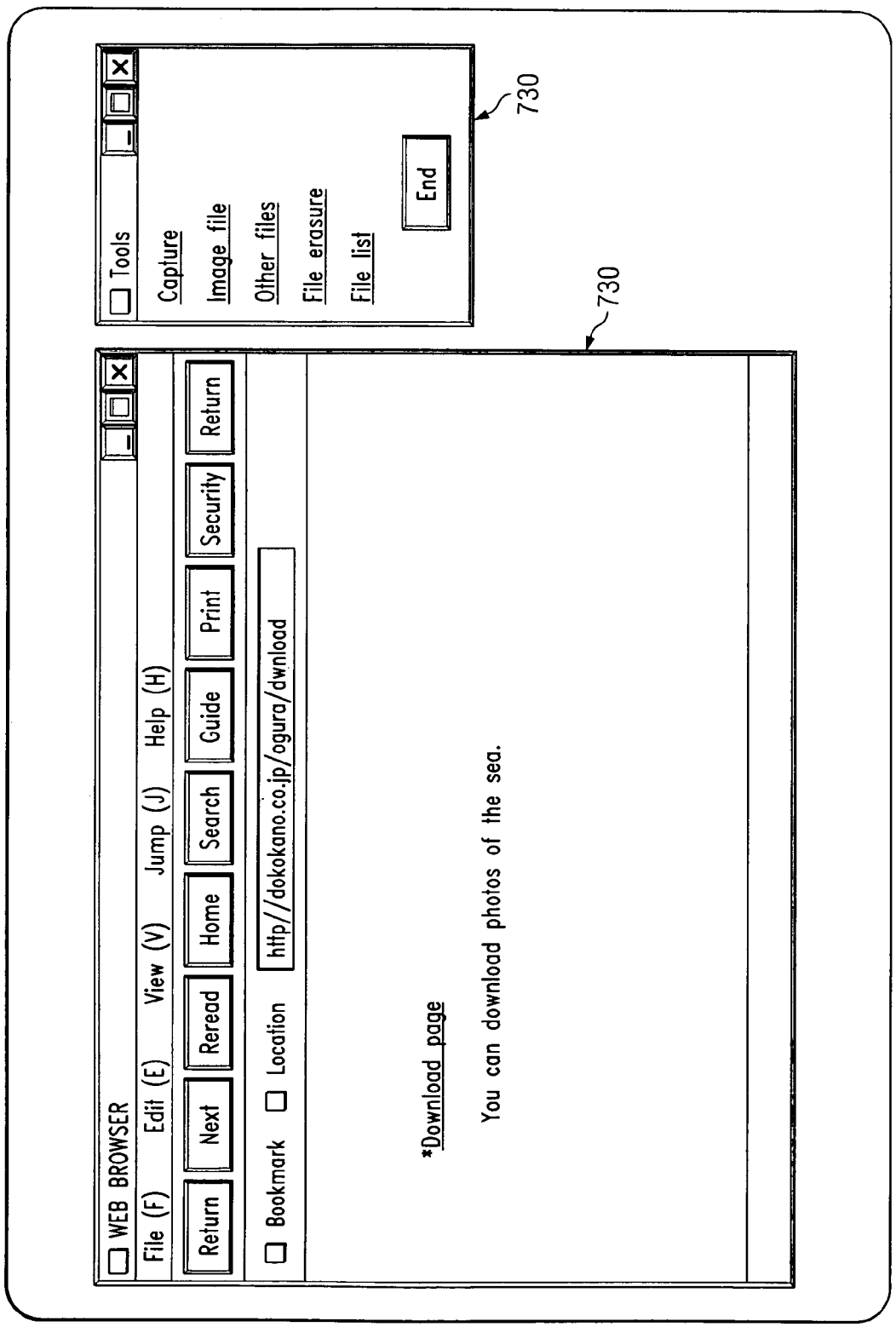
FIG. 9 is a diagram showing a display screen of a client terminal in a preferred embodiment of the present invention.
Figure 10:
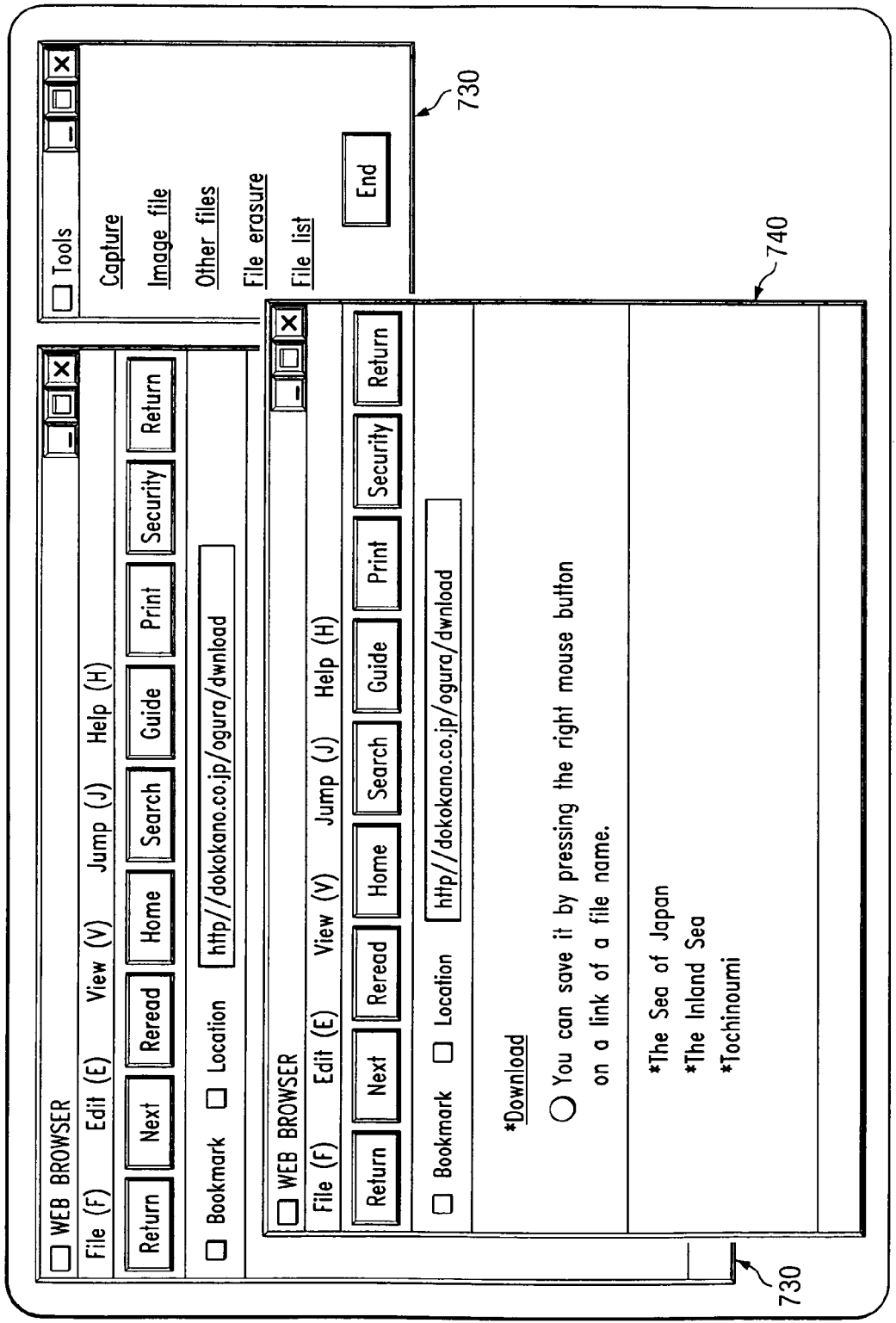
FIG. 10 is a diagram showing a display screen of a client terminal in a preferred embodiment of the present invention.

FIGS. 9 and 10 are diagrams showing processing results of a file list generation process in a preferred embodiment of the present invention. Apart from Web browser window 730, an HTML file generated based on a skeleton file is first displayed (browser window 740). This is because, in the case that collaboration is performed on Web browser window 730, an event which occurred on a Web browser of one client terminal is sent to the client terminal of the other party of collaboration consequently interlocking the other party's Web browser, while reference to a file list should only be shown to the operator who made the request.

As explained above, the present invention makes it possible, just by a simple operation, to display various kinds of information such as an operating state of an application, not directly related to communication existing on a client terminal, on a display screen of another client terminal.

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A method of communicating on a communication system having a client terminal connecting a server through a network and collaborating with other client terminals connected to said network, said method comprising the steps of:
    (a) generating an image file in response to an operator of said client terminal specifying a screen range of said client terminal, wherein the image file is generated based on image data from the specified screen range;
    (b) acquiring an image file name from said server;
    (c) converting said image file to generate a predetermined formed compressed image data which has a file name relating to said image file name;
    (d) sending said predetermined formed compressed image data to said server,
    (e) posting the file name of said predetermined formed compressed image data to the client terminals collaborating with said client terminal, wherein the operator of said client terminal specifies the screen range during a capture mode;
    (f) suspending the capture mode;
    (g) receiving input from the operator to activate a hidden window image; and
    (h) resuming the capture mode.

2. The method of claim 1, wherein the operator specifies a screen range of said client terminal by manipulating a mouse to define a frame, wherein the frame encloses the screen range.

3. The method of claim 1, wherein the operator specifies a screen range of said client terminal by selecting an application window, wherein a frame of the application window defines the screen range.

4. The method of claim 1, further comprising:
    acquiring a device context of a desktop window; and
    generating a desktop window image corresponding to the device context of the desktop window, wherein the screen range is a portion of the desktop window.

5. A client terminal connecting a server through a network and collaborating with other client terminals connected to said network, said client terminal comprising:
    (a) a screen range selector for specifying a screen range in response to operation for specifying screen range by an operator;
    (b) an image file generator for acquiring an image according to said screen range and generating an image file;
    (c) a file acquisition for acquiring an original name from said server;
    (d) an image file converter for converting said image file to generate a predetermined formed compressed image data;
    (e) a file transmitter for sending to said server said predetermined formed compressed image data which has a file name relating to said original name;
    (f) a posting division for posting the file name of said predetermined formed compressed image data to the client terminals collaborating with said client terminal, wherein the operator of said client terminal specifies the screen range during a capture mode;
    (g) a suspending mechanism for suspending the capture mode;
    (h) a receiving mechanism for receiving input from the operator to activate a hidden window image; and
    (i) a resuming mechanism for resuming the capture mode.

6. The client terminal of claim 5, wherein the operator specifies a screen range of said client terminal by manipulating a mouse to define a frame, wherein the frame encloses the screen range.

7. The client terminal of claim 5, wherein the operator specifies a screen range of said client terminal by selecting an application window, wherein a frame of the application window defines the screen range.

8. The client terminal of claim 5, wherein the screen range selector acquires a device context of a desktop window and generates a desktop window image corresponding to the device context of the desktop window, wherein the screen range is a portion of the desktop window.

9. A communication system having a first and a second client terminal connecting with a network and a server connecting said first and a second terminal through said network, said communication system comprising:
    the first client terminal comprising:
        (a1) an image file generator for, in response to operation for specifying a screen range by an operator, generating an image file according to said operation;
        (a2) a file name acquisition division for acquiring an original name from said server;
        (a3) an image file converter for converting said image file to generate a predetermined formed compressed image data;
        (a4) a file transmitter for sending to said server said predetermined formed compressed image data which has a file name relating to said original name;
        (a5) a posting division for posting the name of said predetermined formed compressed image data to said second client terminal, wherein the operator of said client terminal specifies the screen range during a capture mode;
        (a6) a suspending mechanism for suspending the capture mode;
        (a7) a receiving mechanism for receiving input from the operator to activate a hidden window image; and
        (a8) a resuming mechanism for resuming the capture mode;
    (b) a server comprising a file name generator for generating an original name capable of uniquely identifying said first client-terminal in response to a request from said first client terminal and posting it to said first client terminal; and
    (c) a second client terminal for displaying said predetermined formed compressed image data of said server on a Web browser on said second client terminal based on the name of said predetermined formed compressed image data sent from said first client terminal.

10. A storage medium storing a software product for connecting a server through a network and controlling communication performed on a communication system having a client terminal collaborating with other client terminals connected to said network, said software product comprising the program codes for:

(a) directing said client terminal to generate an image file in response to an operator of said client terminal specifying a screen range of said client terminal, wherein the image file is generated based on image data from the specified screen range;

(b) directing said client terminal to acquire an image file name from said server;

(c) directing said client terminal to convert said image file and generate a predetermined formed compressed image data which has a file name relating to said image file name acquired from said server;

(d) directing said client terminal to send predetermined formed compressed image data to said server;

(e) directing said client terminal to post the file name of said predetermined formed compressed image data to the client terminals collaborating with said client terminal, wherein the operator of said client terminal specifies the screen range during a capture mode;

(f) directing said client terminal to suspend the capture mode;

(g) directing said client terminal to receive input from the operator to activate a hidden window image; and (h) directing said client terminal to resume the capture mode.

11. The storage medium of claim 10, wherein the operator specifies a screen range of said client terminal by manipulating a mouse to define a frame, wherein the frame encloses the screen range.

12. The storage medium of claim 10, wherein the operator specifies a screen range of said client terminal by selecting an application window, wherein a frame of the application window defines the screen range.

13. The storage medium of claim 10, said software product further comprising the program codes for:

directing said client terminal to acquire a device context of a desktop window; and directing said client terminal to generate a desktop window image corresponding to the device context of the desktop window, wherein the screen range is a portion of the desktop window.

* * * * *